(12) United States Patent
Jadav et al.

(10) Patent No.: US 6,272,662 B1
(45) Date of Patent: Aug. 7, 2001

(54) DISTRIBUTED STORAGE SYSTEM USING FRONT-END AND BACK-END LOCKING

(75) Inventors: Divyesh Jadav, Campbell; Jaishankar Moothedath Menon, San Jose, both of CA (US); Kaladhar Voruganti, Edmonton (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,004

(22) Filed: Aug. 4, 1998

(51) Int. Cl.[7] .................................................. G11C 29/00
(52) U.S. Cl. ........................................... 714/805; 714/770
(58) Field of Search ................................ 714/6, 52, 800, 714/805, 7, 770; 711/130, 147, 114, 152; 707/201

(56) References Cited

U.S. PATENT DOCUMENTS

| | | | |
|---|---|---|---|
| 4,733,352 | * 3/1988 | Nakamura et al. | 711/152 |
| 4,916,605 | * 4/1990 | Beardsley et al. | 711/162 |
| 5,140,592 | 8/1992 | Idleman et al. | 714/5 |
| 5,208,813 | 5/1993 | Stallmo | 714/7 |
| 5,293,618 | * 3/1994 | Tandai et al. | 711/130 |
| 5,301,297 | 4/1994 | Menon et al. | 711/114 |
| 5,373,512 | 12/1994 | Brady | 714/767 |
| 5,375,128 | 12/1994 | Menon et al. | 714/770 |
| 5,437,022 | * 7/1995 | Beardsley et al. | 714/6 |
| 5,490,248 | 2/1996 | Dan et al. | 714/6 |
| 5,499,337 | * 3/1996 | Gordon | 714/6 |
| 5,526,482 | 6/1996 | Stallmo et al. | 714/6 |
| 5,530,830 | 6/1996 | Iwasaki et al. | 711/114 |
| 5,530,948 | 6/1996 | Islam | 714/6 |
| 5,546,535 | 8/1996 | Stallmo et al. | 714/9 |
| 5,572,660 | 11/1996 | Jones | 714/6 |
| 5,574,863 | 11/1996 | Nelson et al. | 710/100 |
| 5,574,882 | 11/1996 | Menon et al. | 711/114 |
| 5,636,359 | 6/1997 | Beardsley et al. | 711/122 |
| 5,640,530 | * 6/1997 | Beardsley et al. | 711/113 |
| 5,664,187 | 9/1997 | Burkes et al. | 707/205 |
| 5,787,460 | 7/1998 | Yashiro et al. | 711/114 |
| 5,813,016 | * 9/1998 | Sumimoto | 707/201 |
| 5,848,229 | 12/1998 | Morita | 714/7 |
| 5,913,227 | * 6/1999 | Raz et al. | 711/152 |
| 5,999,930 | * 12/1999 | Wolff | 707/8 |
| 6,073,218 | 6/2000 | DeKoning et al. | 711/150 |

OTHER PUBLICATIONS

Cao, P. et al., "The TickerTAIP Parallel RAID Architecture", *ACM Transactions on Computer Systems*, vol. 12, No. 3, pp. 236–269 (Aug. 1994).

Chen, P. et al., "RAID: High–Performance, Reliable Secondary Storage", *ACM Computing Surveys*, vol. 26, No. 2, pp. 145–185 (Jun. 1994).

(List continued on next page.)

*Primary Examiner*—Albert Decady
*Assistant Examiner*—Shelly A Chase
(74) *Attorney, Agent, or Firm*—Merchant, Gould, Smith, Edell, Welter & Schmidt; Altera Law Group, LLC

(57) ABSTRACT

Disclosed is a system for performing an operation, such as a read or write operation, on a data block in a shared disk system. A first adaptor receives a request to perform an operation on a data block maintained in a data storage location. The first adaptor then determines whether the first adaptor controls access to the data block. The first adaptor performs the requested operation on the data block after determining that the first adaptor controls access to the data block. If the first adaptor does not control access to the data block, then the first adaptor transmits a first message to a second adaptor that controls access to the data block and requests control of access to the data block. After receiving the first message, the second adaptor transfers control of access to the data block to the first adaptor. The second adaptor then transmits a second message to the first adaptor that the first adaptor controls access to the data block. After receiving the second message, the first adaptor performs the requested operation on the data block.

35 Claims, 8 Drawing Sheets

OTHER PUBLICATIONS

IBM Brochure, "SSA RAID Adapter for PC Servers", pp. 1–2, ©International Business Machines Corporation 1996.

IBM Manual, "IBM PC ServeRAID Adapter—84H7117 Installation Instructions and User's Guide", 77 pages, First Edition (Jan. 1997).

IBM Brochure, "3527 SSA Storage Subsystem for PC Servers", pp. 1–2, ©International Business Machines Corporation 1997.

IBM Brochure, "IBM PC ServeRAID Adds Two New Features", *IBM Personal computing solutions*, 12 pages (Dec. 16, 1997).

IBM Brochure, "IBM PC Server 704", *IBM Product Summaries, Personal Computing in Canada*, pp. 1–6, Last Published Jan. 16, 1998.

IBM Brochure, "SSA RAID Adapter for PCI", *IBM Storage*, pp. 1–5 (Jan. 16, 1998).

IBM Brochure, Serial Storage Architecture (SSA), *IBM Storage*, pp. 1–2 (Jan. 16, 1998).

IBM Spec Sheet, "PC Server Serial Storage Architecture (SSA) RAID Adapter Spec Sheet", *IBM Personal Computing, Canada*, p. 1, Last Published Nov. 1, 1998.

Hewlett Packard Brochure, "Dynamic RAID Technology From Hewlett–Packard Addresses Issues in Current High Availability", *Hewlett Packard, Enterprise Storage Solutions Division*, pp. 1–6 (Revised Apr. 1997).

Hewlett Packard Brochure, "What are Disk Arrays?", *Information Storage*, pp. 1–11 (Jan. 15, 1998).

Judd, I., et al., "Serial Storage Architecture", *IBM Journal of Research & Development*, vol. 40, No. 6—Nontopical issue, pp. 1–14 (Jan. 16, 1998).

Menon, J. et al., "Algorithms for Software and Low–cost Hardware RAIDs", *IEEE*, pp. 411–418 (1995).

Menon, J., "Performance of RAID5 Disk Arrays with Read and Write Caching", *Distributed and Parallel Databases*, vol. 2, pp. 261–293 (1994).

Menon, J. et al., "The Architecture of a Fault–Tolerant Cached RAID Controller", *Computer Science, Research Report*, pp. 1–28 (Jan. 22,1993).

MYLEX Manual "DAC960SX Family User Guide, Ultra–SCSI to Ultra–SCSI RAID Controllers DAC960SX and DAC960SXI", Manual Version 1.0, Part No. 771975–D01, *Mylex*, ©Copyright 1997 Mylex Corporation.

Patterson, D. et al., "A Case for Redundant Arrays of Inexpensive Disks (RAID)", *ACM*, pp. 109–116 (1988).

Riegal, J. et al., "Performance of Recovery Time Improvement Algorithms for Software RAIDs", *IEEE*, pp. 56–65 (1996).

\* cited by examiner

DISTRIBUTED STORAGE SYSTEM USING FRONT-END AND BACK-END LOCKING

CROSS-REFERENCE TO RELATED APPLICATIONS

This application is related to the following co-pending and commonly-assigned patent applications, all of which are filed on the same date herewith, and all of which are incorporated herein by reference in their entirety:

"System for Updating Data in a Multi-Adaptor Environment," by Jai Menon, Divyesh Jadav, Deepak Kenchammana-Hosekote, Ser. No. 09/128,574;

"System For Changing The Parity Structure Of A Raid Array," by Jai Menon and Divyesh Jadav, Deepak Kenchammana-Hosekote, Ser. No. 09/129,012;

"Updating And Reading Data And Parity Blocks In A Shared Disk System," by Jai Menon, Ser. No. 09/129,067;

"Updating Data and Parity With and Without Read Caches," by Jai Menon, Ser. No. 09/128,438; and "Updating and Reading Data and Parity Blocks in a Shared Disk System with Request Forwarding," by Jai Menon and Divyesh Jadav, Ser. No. 09/128,754.

BACKGROUND OF THE INVENTION

1. Field of the Invention

The present invention relates to a system for storing data in a shared storage device system.

2. Description of the Related Art

In Redundant Arrays of Independent Disks (RAID) systems, data files and related parity are striped across multiple disk drives. In storage subsystems which manage numerous hard disk drives as a single direct access storage device (DASD), the RAID logic is implemented in the controller of the subsystem. RAID storage methodologies have also been implemented in software for execution on a single host computer. This allows the single host computer, such as a personal computer, to implement RAID storage techniques on local hard disk drive space. Such software RAID methodologies are described in "Algorithms for Software and Low Cost Hardware RAIDS," by Jai Menon, Jeff Riegel, and Jim Wyllie, document no. 1063-6390 (IEEE 1995), which is incorporated herein by reference in its entirety.

One problem with the single storage subsystem is the risk of failure. Techniques have been developed to improve failback and recovery in case of failures in the hardware controller. One such failback technique is the Fast Write Technique which provides two separate controllers on different power boundaries that control the flow of data from host systems to DASDs. If one controller fails, the other controller can continue writing data to the DASD. Typically a non-volatile storage unit (NVS) is included with each separate controller, such that each NVS connected to a controller backs up the data the other controller is writing to DASD. Such failback systems employing the two-controller failsafe structure are described in U.S. Pat. Nos. 5,636,359, 5,437,022, 5,640,530, and 4,916,605, all of which are assigned to International Business Machines, Corporation (IBM), the assignee of the subject application, and all of which are incorporated herein by reference in their entirety.

RAID systems can also be implemented in a parallel computing architecture in which there is no central controller. Instead, a plurality of independent controllers that control local hard disk storage devices are separate nodes that function together in parallel to implement RAID storage methodologies across the combined storage space managed by each node. The nodes are connected via a network. Parity calculations can be made at each node, and not centrally. Such parallel RAID architecture is described in "The TickerTAIP Parallel RAID Architecture," by Pei Cao, Swee Boon Lim, Shivakumar Venkatarman, and John Wilkes, published in ACM Transactions on Computer Systems, Vol. 12, No. 3, pgs. 236–269 (August, 1994), which is incorporated herein by reference in its entirety.

One challenge in shared disk systems implementing a parallel, shared disk RAID architecture is to provide a system for insuring that data is properly updated to disks in the system, that a write or update request invalidates stale data so such stale data is not returned, and that a read request returns the most current data.

SUMMARY OF THE INVENTION

To overcome the limitations in the prior art described above, preferred embodiments of the present invention disclose a system for performing an operation on a data block in a shared disk system. A first adaptor receives a request to perform an operation on a data block maintained in a data storage location. The first adaptor then determines whether the first adaptor controls access to the data block. The first adaptor performs the requested operation on the data block after determining that the first adaptor controls access to the data block. If the first adaptor does not control access to the data block, then the first adaptor transmits a first message to a second adaptor that controls access to the data block and requests control of access to the data block. After receiving the first message, the second adaptor transfers control of access to the data block to the first adaptor. The second adaptor then transmits a second message to the first adaptor that the first adaptor controls access to the data block. After receiving the second message, the first adaptor performs the requested operation on the data block.

In further embodiments, the requested operation is a write operation to update the data block associated with the lock unit. If the first adaptor controls access to the data block, then the first adaptor writes an update to the data block into a memory location and sets a lock state on the data block. If the second adaptor controls access, then the first adaptor must receive the second message before setting a lock state on the data block and writing the update to the data block into the memory location.

Further embodiments concern a read operation on a data block in a shared disk system. A first processing unit receives a read request for a data block maintained in a data storage location. The first processing unit then determines whether the first processing unit controls access to the data block. The first processing unit reads the data block after determining that the first processing unit controls access to the data block. Upon determining that the first processing unit does not control access to the data block, the first processing unit obtains control of the data block and performs the requested read operation on the data block.

With the preferred embodiments, access to data blocks is controlled. Controlling access helps insure that parity updates are properly handled, data in memory locations is invalidated so that stale or outdated data is not returned to a later read request, stale data is not destaged to a storage device, and a read request returns the latest version of the data block.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
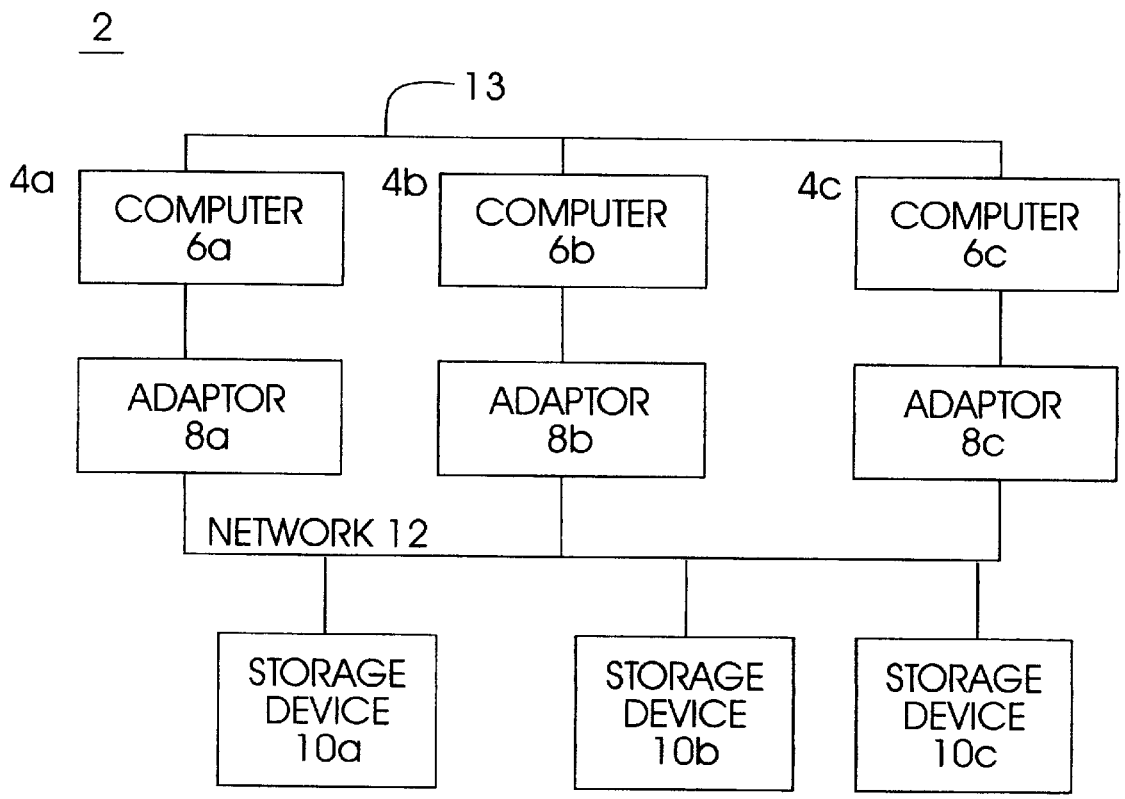
FIG. 1 illustrates a preferred hardware and software environment in which preferred embodiments of the present invention are implemented.

FIG. 1 illustrates a shared device environment comprised of nodes 4a, b, c. Each node includes a computer 6a, b, c, i.e., central processing unit, and an adaptor card 8a, b, c. A plurality of storage devices 10a, b, c interface via a network 12 to the adaptor cards 8a, b, c and attached computers 6a, b, c. The computer 6a, b, c may be a personal computer, workstation, mainframe, etc. The adaptor cards 8a, b, c interface with their respective computers 6a, b, c via a PC bus, such as the PCI bus, and include one or more disk interface ports, such as SCSI or Serial Storage Architecture (SSA) ports. The adaptor cards 8a, b, c include logic to execute the RAID algorithms. The storage devices 10a, b, c may be any suitable non-volatile storage device known in the art, including hard disk drives, magnetic tape, optical disks, non-volatile RAM, holographic units, etc. The nodes 4a, b, c and storage devices 10a, b, c interface via the network 12, which is preferably a high speed interconnect, such as SCSI, SSA, SNA, SAN, FDDI, etc. Additionally, the network 12 may be a SCSI or SSA bus. In further embodiments more nodes than shown may be included in the shared device system 2. Each node may include multiple adaptors, multiple processors and/or local (non-shared) storage devices.

FIG. 1 further illustrates an additional network 13 providing an additional communication line among the computers 6a, b, c. This additional network 13 may be comprised of any suitable network known in the art, e.g., ETHERNET, LAN, etc.

In preferred embodiments, the computers 6a, b, c run parallel processing software, such as the ORACLE PARALLEL SERVER™, the MICROSOFT® Wolfpack Clustering System or any other clustering software. ORACLE PARALLEL SERVER is a trademark of Oracle Corporation; MICROSOFT is a registered trademark of Microsoft Corporation. This parallel processing software allows the computers 6a, b, c to share storage devices 10a, b, c such that any node 4a, b, c may access any block in any of the storage devices 10a, b, c. This parallel architecture allows data to be distributed across different storage devices 10a, b, c throughout the shared device system 2. The parallel processing software, implemented in the computers 6a, b, c, may perform logical locking to insure that only one write request is made to a block in any of the storage devices 10a, b, c, at any given time and to insure that an application does not attempt to read a block being modified by another application. To perform logical locking under control of the parallel processing software, the computers 6a, b, c would exchange messages, data, and information via the additional network 13. The adaptors 8a, b, c perform physical locking.

Figure 2:
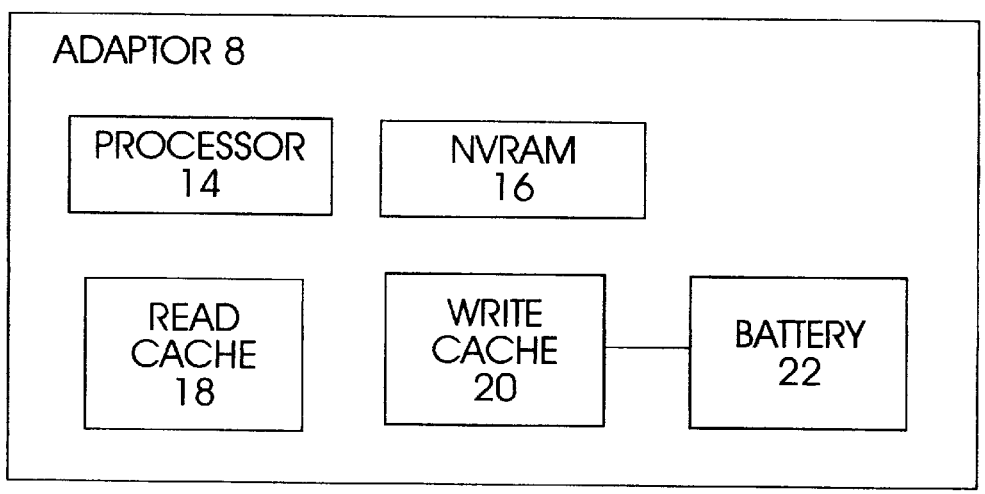
FIG. 2 illustrates a preferred hardware and software architecture of an adaptor in accordance with preferred embodiments of the present invention.

FIG. 2 illustrates a preferred embodiment of the adaptors 8a, b, c. Each adaptor 8a, b, c includes a processor 14a, b, c, a non-volatile RAM 16a, b, c for storing control information, a read cache 18a, b, c, and a write cache 20a, b, c. The read 18a, b, c and write 20a, b, c caches may be comprised of volatile memory, such as RAM, or a non-volatile memory unit, e.g., non-volatile RAM. In certain embodiments, the read cache 18a, b, c and write cache 20a, b, c may be areas within the same memory device or located within separate memory devices. In further embodiments, there may be no read 18a, b, c and/or write 20a, b, c caches. In preferred embodiments, the write caches 20a, b, c contain dirty blocks, which is data intended for a block in the storage device 10a, b, c that is more recent than the block actually maintained in the storage device 10a, b, c. Once the data is written from the write cache 20a, b, c to the storage device 10a, b, c, the copy of the data in the cache is "clean." Because the write cache 20a, b, c only maintains "dirty" blocks, the clean copy in the cache after the update is considered to be in the read cache 18a, b, c, not the write cache 10a, b, c anymore. The components of the adaptors 8a, b, c may be implemented as PC cards such the PC ServeRAID SCSI adaptor from IBM. Alternatively, components and functionality of the adaptors 8a, b, c could be implemented in the computers 6a, b, c.

In certain embodiments, the read cache 18a, b, c may be implemented in a volatile memory device, e.g., DRAM, RAM, etc., and the write cache 20a, b, c may be attached to a battery 22 which makes the write cache 20a, b, c a non-volatile memory device. In such case, an update to a block is initially written in both the RAM (read cache) and the battery 22 backed up write cache 20a, b, c. Once the dirty data is destaged to the storage device 10a, b, c, the copy from the write cache 20a, b, c is marked as invalid for later removal, leaving only the clean copy in the RAM, i.e., read cache. In alternative embodiments, the dirty data may be sent to all other adaptors in the system to invalidate any stale data in their caches. In embodiments with only a single memory device for the read 18a, b, c and write 20a, b, c caches, the data is considered to be in the write cache 20a, b, c prior to destaging and in the read cache 18a, b, c after destaging even though the data remains in the same memory device.

In preferred embodiments, the adaptors 8a, b, c must satisfy all of the following correctness conditions:

(1) a request to write a data block from adaptor 8a simultaneous with a request to write another data block from adaptor 8*b*, where the two data blocks have the same parity block, causes a correct parity update in the sequence which the updates were made;

(2) a write request through one adaptor 8*a* for a block in the read 18*b* or write 20*b* cache at another adaptor 8*b* causes the invalidation of data in cache 18*b* or 20*b* so that stale data is not returned to a subsequent read request or later destaged to the storage device 10*b* from old data in caches 18*b*, 20*b*; and (3) a read request through one adaptor 8*a* for a block cached at adaptor 8*b* in read 18*b* or write 20*b* cache, returns the latest version of the data block from adaptor 8*b*.

Those skilled in the art will recognize that alternative conditions to the three mentioned above may also be satisfied.

Parity in a RAID Environment

Figure 3A:
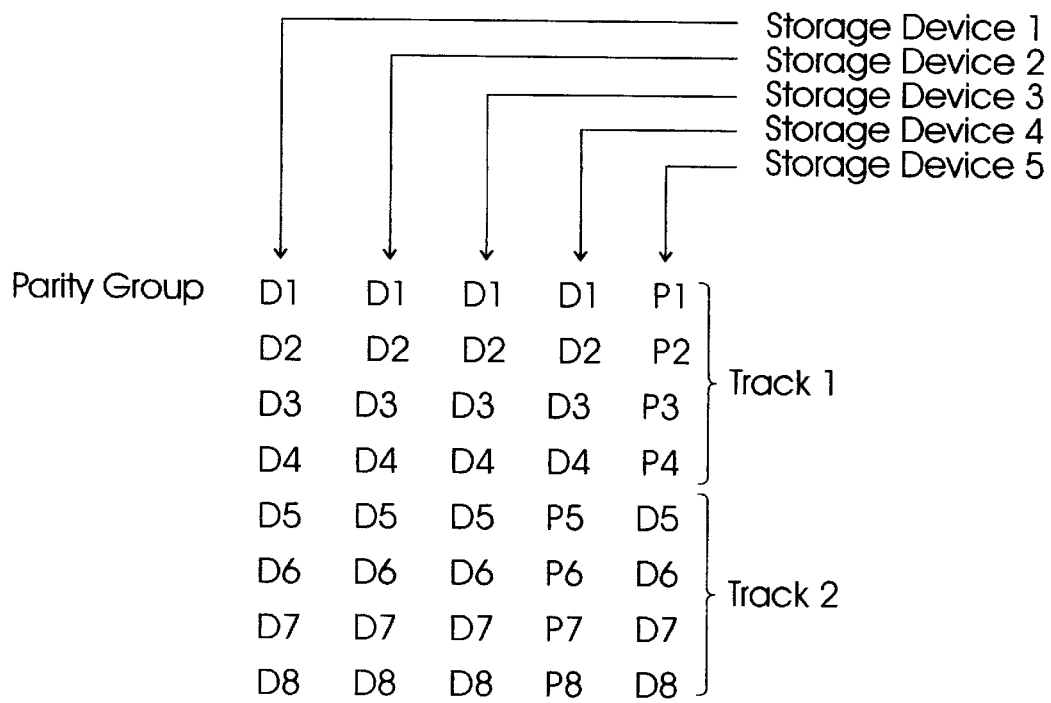
FIG. 3 illustrates an embodiment of how data and parity blocks are arranged on storage devices.

FIG. 3*a* illustrates a 4+P RAID disk array in which a parity block $P_i$ protects four data blocks $D_i$ in four storage devices. Each vertical column represents a storage device. A parity group is a row in the illustration of FIG. 3*a* that consists of four data blocks $D_i$, one in each storage device, and a parity block $P_i$ maintaining parity information for the four data blocks $D_i$. A parity value $P_i$ is the exclusive OR of the data blocks $D_i$ in the same parity group of a given i. If a disk fails, then the data can be recreated by processing the parity block ($P_i$) and the remaining data blocks $D_i$ for the parity group. FIG. 3*a* further shows the rotation of parity in that parity blocks $P_5$ through $P_8$ are on a different disk, storage device 4, than the previous parity blocks which are on storage device 5.

In preferred embodiments, a parity block can be updated with the following exclusive OR operation, where the new parity $(P_i')$=(old data $(D_i)$ XOR new data $(D_i')$ XOR old parity $(P_i)$.

Figure 3B:

In certain embodiments, data may be stored in "stripe units" on the storage devices. FIG. 3*b* illustrates a "stripe unit" of data. A stripe unit consists of multiple consecutive blocks of data on a storage device. The "stripe unit" shown in FIG. 3*b* has two consecutive blocks of data, blocks 1 and 2. A "stripe" consists of multiple stripe units. The "stripe" shown in FIG. 3*b* has five stripe units. In the exemplar of FIG. 3*b*, a stripe unit includes blocks from two parity groups throughout each storage device. In alternative embodiments a "stripe unit" and "stripe" could be defined in alternative manners, e.g., including more than two blocks of data, depending on the number of storage devices and parity groups.

In alternative embodiments, other parity schemes may be utilized, such as mirrored RAID, bit-interleaved parity, block-interleaved distributed-parity or P+Q redundancy, etc. These various RAID schemes are discussed in "RAID: High-Performance, Reliable Secondary Storage," by Peter M. Chen, Edward K. Lee, Garth A. Gibson, Randy H. Katz, and David A. Patterson, published in ACM Computing Surveys, Vol. 26, No. 2, pgs. 145–185 (June, 1994), which publication is incorporated herein by reference in its entirety.

Front End and Back End Locking Schemes

A write cache 20*a, b, c* in an adaptor 8*a, b, c* that stores data that is more recent than the version of that data in the corresponding block in the storage device 10*a, b, c* is a "dirty block." When data is first updated from D to D', the dirty data D' is stored in the read cache 18*a, b, c* and in the battery backed-up write cache 20*a, b, c*. Once the dirty data is destaged from the write cache 20*a, b, c* to the storage device 10*a, b, c*, the read cache 18*a, b, c* copy is referred to as a "clean block." After destaging, any backup copy of the dirty data in the write cache 20*a, b, c* may be eliminated, leaving only a "clean" copy of the destaged "dirty data" in the read cache 18*a*.

Data is transferred to a node 4*a, b, c* for storage in the attached storage device 10*a, b, c* in two phases, a front-end phase and a back-end phase. A front-end lock refers to a state associated with a block of data to which a read or data update request is directed, whether a version of that block of data is located in the storage device 10*a, b, c*, read cache 18*a, b, c*, or write cache 20*a, b, c*. A back-end lock refers to a state associated with a data block maintaining parity data or involved in a destaging operation.

In the front-end phase, data is written to the write cache 20*a, b, c*, but not moved to the attached storage device 10*a, b, c*. In the back-end phase, data is destaged from the write cache 20*a, b, c* to the attached storage device 10*a, b, c*. The adaptors 8*a, b, c* at each node 4*a, b, c* include logic, e.g., software and/or hardware, to issue locking commands to control access to the data block represented by the lock unit, whether the most recent version of that data block is maintained in the storage devices 10*a, b, c*, read cache 18*a, b, c*, or write cache 20*a, b, c*. An adaptor 8*a, b, c* cannot access data unless that adaptor controls or owns the lock unit for that data block. Locking commands to control access to data insure that stale data at any adaptor 8*a, b, c* is invalidated and that a read request gets the most current copy of data, wherever that most current copy of data may reside in the shared device system 2. Further, the back-end phase of locking insures that updates of parity blocks on the disk drives are synchronized. As discussed, parity data is stored throughout the shared device system 2, such that a storage device 10*a, b, c* may include parity for data maintained throughout the shared device system 2.

A lock state applies to one or more data blocks referred to as a locking unit. A version of data maintained in the storage devices 10*a, b, c* may be maintained in the read 18 or write 20 caches. A lock state could apply to a data block lock unit, whether that data block is maintained only in the storage device 10*a, b, c* and versions of the lock unit data block maintained in the read 18 or write 20 cache. For front-end locks, the locking unit may be a data block or any other grouping of data. For back-end locks that apply to the parity data, the locking unit may be a parity group. In preferred embodiments, the front-end and back-end locking schemes are separate and do not conflict. Thus, parity updates can be done independently of data updates. In alternative embodiments, a unified locking scheme may be used. In a unified locking scheme, parity data or data in the write cache 20*a, b, c* cannot be updated if another adaptor 8*b* is involved in a destage operation.

There are three possible lock states in a write-optimized system that may be designated for a lock unit, unlocked, read lock (RL) or write lock (WL). Only an adaptor 8*a, b, c* that is designated the "owner" of a lock unit may place a lock, e.g., RL or WL, on the lock unit. In preferred embodiments, there is only one adaptor 8*a, b, c* that is the owner of a front-end lock for a lock unit. All adaptors 8*a, b, c* maintain information on which adaptor 8*a, b, c* has ownership of a lock unit within the system 2. An adaptor 8*a, b, c* that owns a lock unit may set the lock state without informing other adaptors 8*a, b, c*. An adaptor 8*a, b, c* that wants to access a data block having a locking unit that the accessing adaptor does not own must send a message to the current owner adaptor 8a, b, c before accessing the data represented by the lock unit. This ownership requirement provides an arbitration system for handling access to a data block because ownership of the lock unit is required before the data block for the lock unit is accessed.

In preferred embodiments, initially, each adaptor 8a, b, c has ownership of 1/n of the lock units, where n is the number of adaptors 8a, b, c. Thus, in a two adaptor case, each adaptor has ownership over one-half of the lock units. Ownership may change during update requests as non-owner adaptors 8a, b, c seek ownership to place a lock on data. If change in ownership is made, an adaptor 8a, b, c involved in the ownership change, the new or old owner, would send a message to all other adaptors 8a, b, c in the network 12 indicating the change in ownership for a particular locking unit. In preferred embodiments, only the owner adaptor 8a, b, c maintains information indicating the locking state of the lock units it owns. In this way, all nodes 4a, b, c in the system 2 maintain information on the current lock owners for each lock unit.

In preferred embodiments, an adaptor 8a, b, c must have a read lock (RL) on a front-end lock unit, such as a block of data in the read cache 18a, b, c or write cache 20a, b, c, before it can perform a read operation on the data block associated with the front-end lock unit. This insures that only the most up to date data is read because the read lock (RL) is placed after data is destaged and clean data is transferred to the read cache 18a, b, c. A read lock placed further indicates that data in storage device 10a, b, c is current because the read lock (RL) is placed after data is destaged.

An adaptor 8a, b, c must have a write lock (WL) on the lock unit associated with a data block before it can update the data block in the write cache 20a, b, c. The write lock (WL) insures that stale data is invalidated as part of the update.

If a data block is in a read cache 18a, b, c, then the owner adaptor 8a, b, c of that lock unit including the data block must have a read lock on that lock unit. Likewise, if a particular data block is in a write cache 20a, b, c, then the owner adaptor 8a, b, c of that lock unit including the data block must have a write lock.

Figure 4A:
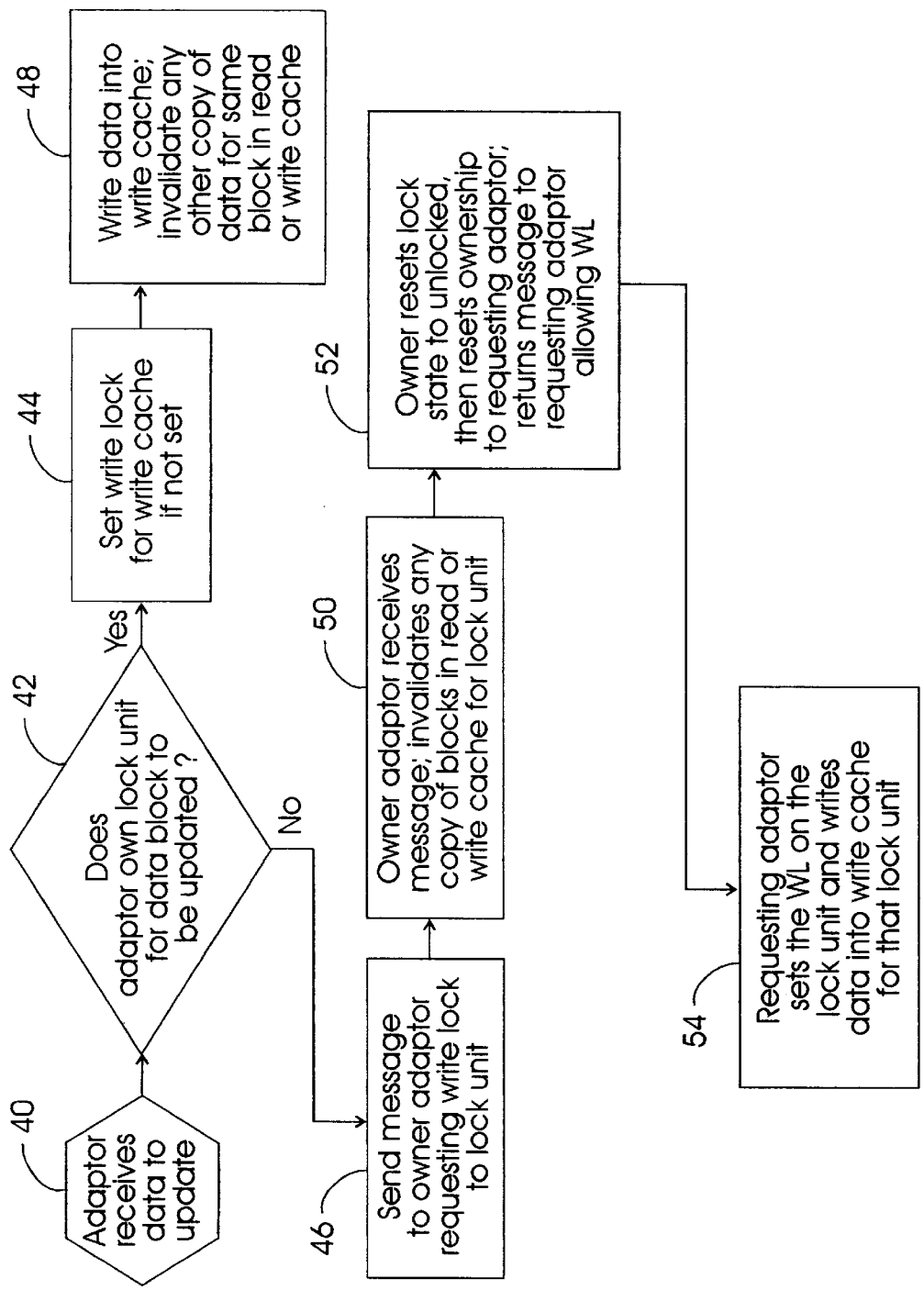
FIG. 4a illustrates a flowchart showing logic to update a data block in accordance with preferred embodiments of the present invention.

The logic of FIGS. 4a, b, 5, 6, 7, and 8 illustrates logic to control locking and access in a shared disk system 2. This logic is implemented in a memory within the adaptors 8a, b, c or within the computers 6a, b, c, which then control the adaptors 8a, b, c to perform the preferred logic. In alternative embodiments, a server may manage and arbitrate communication between the nodes.

Thus, the preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Write Optimized Algorithm with Front-End/Back-End Locking

FIGS. 4a, b illustrate logic implemented in a memory area of the adaptors 8a, b, c. Alternatively, the logic may be implemented in the computers 6a, b, c, which in turn control the adaptors 8a, b, c to update and read a block of data in a storage device 10a, b, c. This logic is write optimized because an adaptor 8a, b, c can update data in its write cache 20a, b, c without transmitting messages to the other adaptors if the adaptor 8a, b, c owns the front-end lock unit associated with the data to update.

FIG. 4a illustrates logic to update a data block associated with a locking unit. Control begins at block 40 which represents an adaptor, e.g., adaptor 8a, receiving a block of data to update in a storage device 10a, b, c. Control transfers to block 42 which represents the adaptor 8a determining whether the adaptor 8a owns the lock unit for the data to be updated. If so, control transfers to block 44; otherwise control transfers to block 46. Block 44 represents the owning adaptor 8a setting a write lock (WL) for the lock unit in its write cache 20a if not set. Control then transfers to block 48 which represents the adaptor 8a writing data into the write cache 20a and invalidating any other data in the read 18a or write 20a cache for that lock unit. This eliminates stale versions of the data.

If the adaptor 8a does not have ownership and adaptor 8b has ownership, then at block 46, adaptor 8a sends a message to owner adaptor 8b requesting a write lock for the lock unit for the data to be updated. Control transfers to block 50 which represents the owner adaptor 8b receiving the message and then invalidating any existing copies of the data to be updated in the read 18b and write 20b caches. Control then transfers to block 52 which represents the owner adaptor 8b resetting the lock state to unlocked for the lock unit of the data to be updated, resetting ownership to the requesting adaptor 8a, and then notifying the requesting adaptor 8a of the change in ownership. Control transfers to block 54 which represents the adaptor 8a setting a write lock in its write cache 20a for the lock unit and then writing data into the write cache 20a.

With the logic of FIG. 4a, before data is updated, the current data in the read 18 and write 20 caches will be invalidated. This insures that only the updated data is available.

Figure 4B:
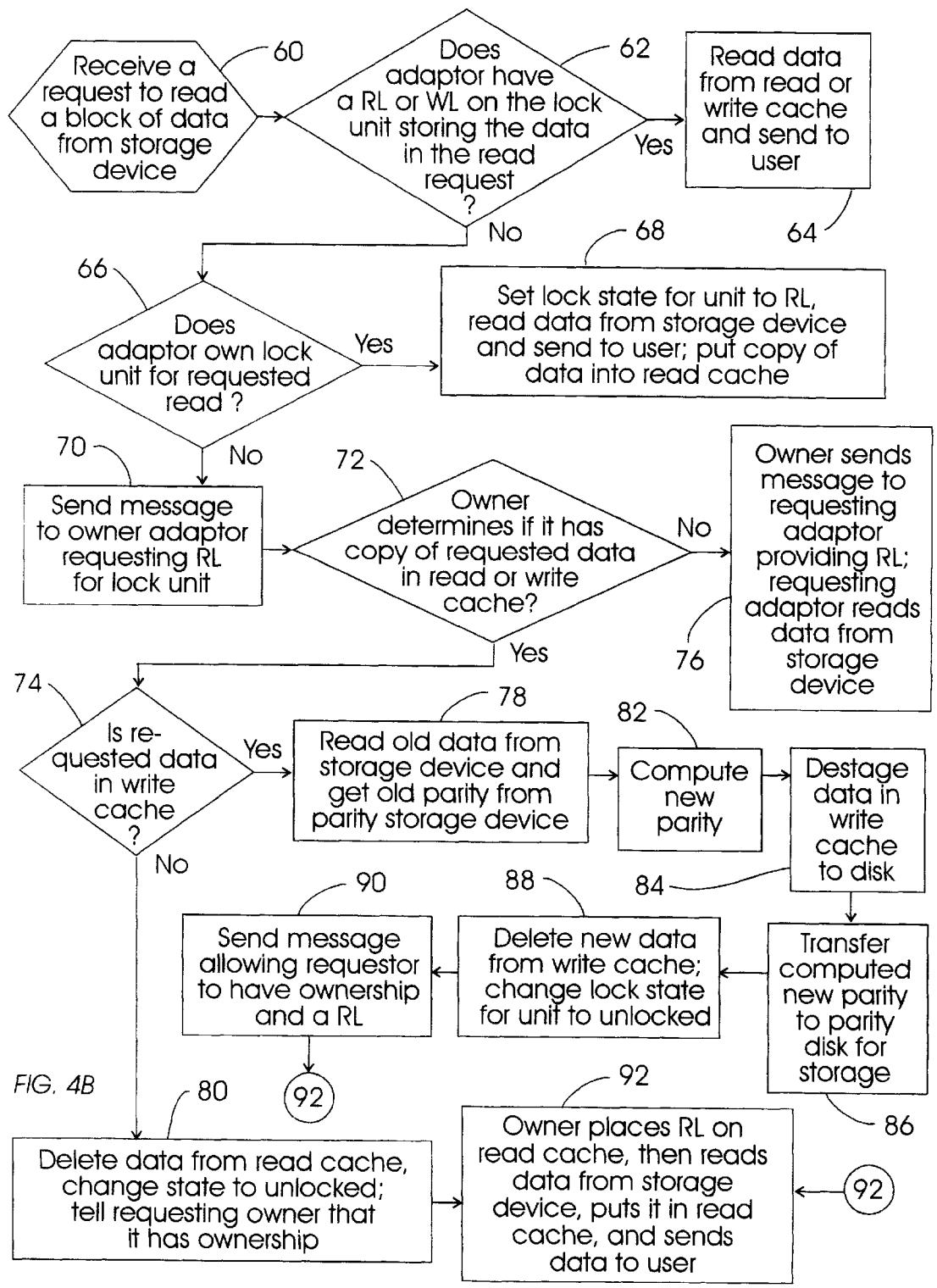
FIG. 4b illustrates a flowchart showing logic to read a data block in accordance with preferred embodiments of the present invention.

FIG. 4b is a flowchart of logic used to read a block of data from a storage device 10a, b, c. The read request may be made by any type of requester, including an application program or a device in communication with the system 2. Control begins at block 60 which represents an adaptor, e.g., adaptor 8a, receiving a request to read a block of data. Control transfers to block 62 which represents the adaptor 8a determining whether it has a read lock (RL) or write lock (WL) on the requested data. If so, control transfers to block 64; otherwise, control transfers to block 66. Block 64 represents the adaptor 8a reading data from its read 18a or write 20a cache, which is the most current data as it is locked, and then transferring the data to the user. Block 66 represents the adaptor 8a determining whether it owns the lock unit for the requested data. If so, control transfers to block 68 which represents the adaptor 8a setting the lock state for that lock unit to read lock (RL), and reading the requested data from the storage device 10a for that adaptor 8a. The adaptor 8a then sends a copy of the data read from the storage device 10a to the user and maintains a copy in the read cache 18a. The locked read cache 18a now stores the current data.

If the adaptor 8a does not have ownership, at block 70, the adaptor 8a sends a message to the owner adaptor, e.g., adaptor 8b, requesting a read lock (RL) for the lock unit corresponding to the requested data. Control transfers to block 72 which represents the owner adaptor 8b determining whether there is data in the owner adaptor's 10b read 18b or write 20b cache for the requested lock unit. If so, control transfers to block 74; otherwise, control transfers to block 76 which represents owner adaptor 8b sending a message to the requesting adaptor 8a providing the read lock (RL). At block 76, once the new owner adaptor 8a has the read lock (RL), the owner adaptor 8a reads the data from the storage device 10b of the previous owner adaptor 8b, provides a copy of the data to the user and puts a copy in its read cache 18a.

Block 74 represents the owner adaptor 8b determining whether data for the requested lock unit is present in the write cache 20b. If so, control transfers to block 78; otherwise, control transfers to block 80. Block 78 represents the owner adaptor 8b reading older data (D) from the storage device 10b and retrieving the old parity data (P) from a location in the storage devices 10a, b, c storing the corresponding parity data. The parity data (P) is for the parity group including data (D). Control transfers to block 82 which represents the owner adaptor 8b calculating the new parity. In preferred embodiments, parity may be calculated by taking the exclusive OR of the old data (D) xor the new data (D') xor and the old parity (P). Control transfers to block 84 which represents the owner adaptor 8b destaging the dirty data in the write cache 20b to the storage device 10b. Control then transfers to block 86 representing the adaptor 8b transferring the computed new parity to the location in the storage devices 10a, b, c storing the parity data. Control transfers to block 88 which represents the owner adaptor 8b deleting the updated data from the write cache 20b and changing the lock state for the requested lock unit to unlocked. Control then transfers to block 90 which represents the owner adaptor 8b sending a message to the requesting adaptor 8a transferring ownership of the requested lock unit, which has a read lock (RL). Once the adaptor 8a has a read lock, control transfers to block 92 which represents the adaptor 8a reading the updated data from the storage device 10b, placing the data in its own read cache 18a, and providing the data to the user.

If the requested data block is not in the write cache 20b, but is instead in the read cache 18b, then at block 80, the owner adaptor 8b deletes the requested data from the read cache 18b, changes the state of the lock unit to unlocked, and informs the requesting adaptor 8a that adaptor 8a has ownership of the requested lock unit. Control transfers to block 92 which represents the owner adaptor 8a placing a read lock (RL) on the lock unit for the data to be read, then reading the requested data from the storage device 10b. The adaptor 8a transfers a copy of the read data to the user and places a copy of the data in its own read cache 18a.

There are at least two alternative steps for blocks 78 through 92 when the requested data is in the write cache 20b and subject to a write lock (WL). In a first alternative, the owner adaptor 8b may read the old data from the storage device 10b, calculate partial parity, e.g., D xor D', store the partial parity in the NVRAM 16b, and then store information on the location of the old parity (P) in the NVRAM 16b. The owner adaptor 8b would then write new data D' to the storage device 10b, delete new data from the read 18b and write 20b caches, change lock state for lock unit including requested data to unlocked. The owner adaptor 8b would then inform the requesting adaptor 8a that it has ownership. The new adaptor 8a would then place a read lock (RL) on the lock unit, read the requested data from the storage device 10b and return the data to the user. A copy of the read data may be maintained in the new adaptor's 10a read cache 18a.

In a second alternative embodiment, the owner adaptor 8b can send a message along with the dirty data in the write cache 10b of the owner adaptor 8b to the requesting adaptor 10a along with the transfer of ownership for the requested lock unit. After the requesting adaptor 8a receives the dirty data, the owner adaptor 8b removes the data from its caches 18b, 20b, changes the lock state to unlocked, and resets ownership information to indicate change of ownership to adaptor 8a. If there are additional adaptors in the system 2, e.g., adaptor 8c, then such additional adaptors would be informed of the change in ownership. The new owner adaptor 8a maintains the dirty data in its write cache 20a and would set a write lock (WL) on this dirty data. The adaptor 8a would then transmit the data from the write cache 20a to the user.

Parity Flushing Algorithm

Figure 5:
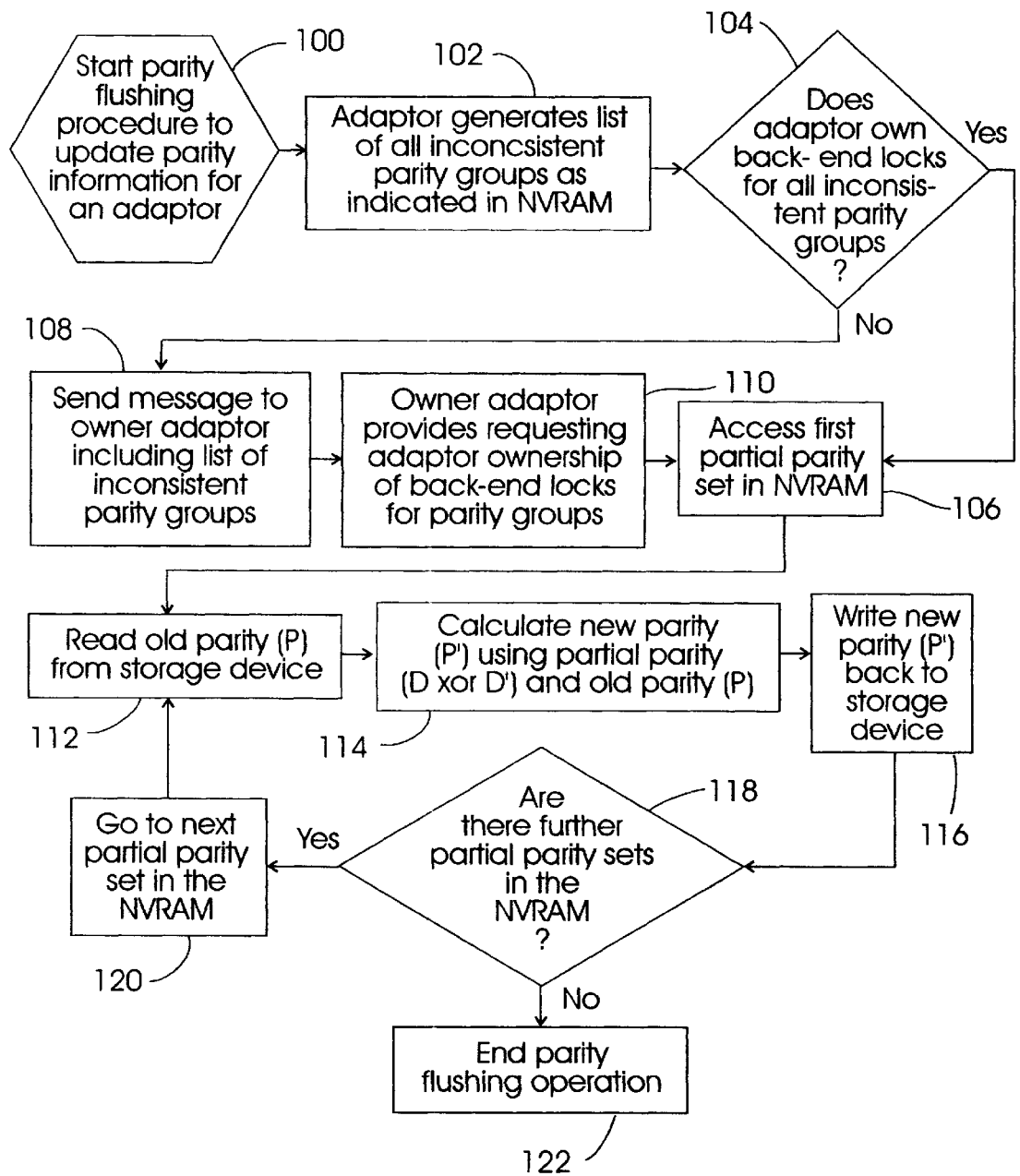
FIG. 5 illustrates a flowchart showing logic to update parity data in accordance with preferred embodiments of the present invention.

FIG. 5 illustrates logic implemented in the adaptors 8a, b, c, or the computers 6a, b, c which may control the adaptors 8a, b, c to update the parity information. In alternative one of the logic of FIG. 4b, partial parity information (D xor D') is stored in the NVRAM 16. The logic of FIG. 5 is used to update the parity information for which partial parity is maintained. The partial parity information maintained in NVRAM 16 indicates a parity group, i.e., $D_i$, $D_j$, $D_i$, $P_i$, having outdated parity ($P_i$) information.

Control begins at block 100 which represents an adaptor, e.g., adaptor 8a, starting a parity flush procedure to update the parity information. Adaptor 8a may initiate the parity flushing logic of FIG. 5 when the number of inconsistent partial parity sets maintained in the NVRAM 16a reaches a predetermined threshold. Control transfers to block 102 which represents the adaptor 8a generating information on all inconsistent parity groups as indicated by the partial parity data in the NVRAM 20a. Inconsistent parity groups are parity groups whose parity $P_i$ is inconsistent with the data $D_i$. Control transfers to black 104 which represents the adaptor 10a determining whether it owns the back-end locks for all the parity groups associated with the partial parity data. If so, control transfers to block 106; otherwise, control transfers to block 108. Block 108 represents the adaptor 8a sending a message to the owner adaptor, e.g., adaptor 8b, including the list of inconsistent parity groups whose locks are owned by adaptor 8b.

Control then transfers to block 110 which represents the owner adaptor 8b transferring the requesting adaptor 8a ownership of the back-end locks for the inconsistent parity groups. From blocks 104 and 110, control transfers to block 106 which represents the adaptor 8a accessing the first partial parity set in the NVRAM 16a. Control transfers to block 112 which represents the adaptor 8a reading the old parity ($P_i$) from the storage device, e.g., storage device 10a, storing the old parity. Control then transfers to block 114 which represents the adaptor 8a calculating the new parity ($P_i'$) using the partial parity and the old parity (P). In preferred embodiments, the new parity may be calculated from D xor D' xor P. However, those skilled in the art will recognize alternative methods for calculating the parity data. Control then transfers to block 116 which represents the adaptor 8a writing the new parity ($P_i'$) in the storage device 10a replacing the old parity data ($P_i$).

Control then transfers to block 118 which represents the adaptor 8a determining whether there are further partial parity sets in the NVRAM 16a. If so, control transfers back to block 120 to access the next partial parity set in the NVRAM 16a, and then proceed back to block 112 et seq. to calculate the new parity for the partial parity set. If there are no further partial parity sets indicated in the NVRAM 16a, then control transfers to block 122 to end the parity flushing operation.

Destage Algorithm

Figure 6:
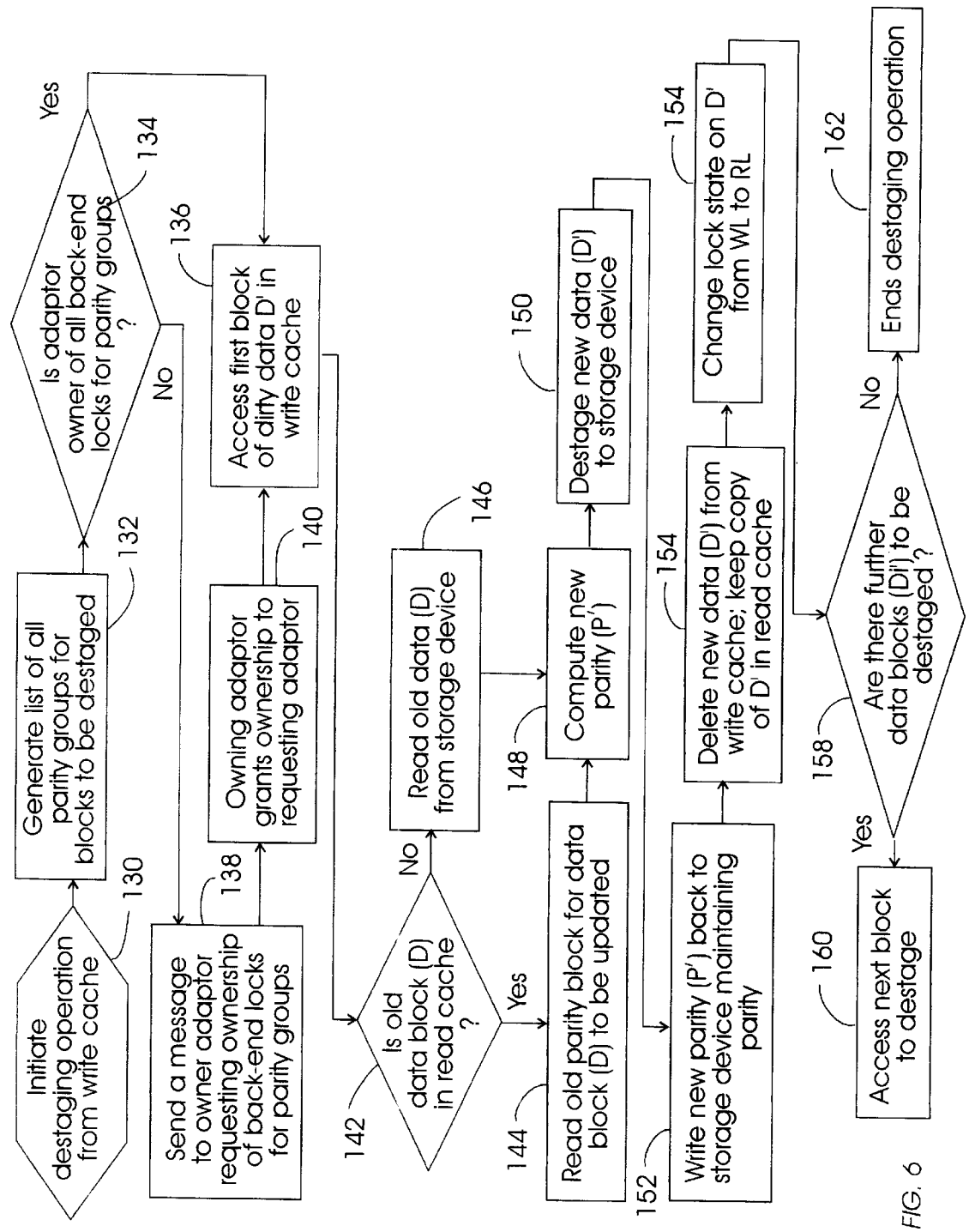
FIG. 6 illustrates a flowchart showing logic to destage data from a write cache to a storage device in accordance with preferred embodiments of the present invention.

FIG. 6 illustrates preferred logic implemented in the adaptors 8a, b, c or the computer 6a, b, c for destaging updates in the write cache 20a, b, c when a given write cache 20a, b, c is filled with data to a predetermined threshold.

Control begins at block 130 which represents an adaptor, e.g., adaptor 8a, initiating a destage operation when the write cache 20a reaches a predetermined threshold. To perform a destage to make more room in the write cache 20a, not all of the data has to be destaged, thereby leaving the write cache 20a only partially full. Control transfers to block 132 which represents the adaptor 8a generating a list of all parity groups to be destaged. Control transfers to block 134 which represents the adaptor 8a determining whether it owns all the back-end locks for the parity groups in the list. If so, control transfers to block 136; otherwise, control transfers to block 138.

For those back-end locks on parity groups in the list the adaptor 8a does not own, at block 138, adaptor 8a sends a message to the adaptor owning the lock on the parity data, e.g., adaptor 8b, requesting ownership of the back-end locks for the parity groups in the list. Control transfers to block 140 which represents the owner adaptor 8b granting ownership to the requesting adaptor 8a. From blocks 134 and 140, control transfers to block 136 which represents the adaptor 8a accessing the first block of dirty data (D') in the write cache 20a. Control then transfers to block 142 which represents the adaptor 10a determining whether the old data block (D) is in the read cache 18a. If so, control transfers to block 144; otherwise, control transfers to block 146 to read the old data ($D_i$) from the storage device 10a. Block 144 represents the adaptor 8a reading the old parity block ($P_i$) for the data block ($D_i$) to be updated. This old parity block ($P_i$) may be in the storage device 10a, b, c.

From blocks 144 and 146, control transfers to block 148 which represents the adaptor 8a computing the new parity ($P_i'$). In preferred embodiments, the new parity ($P_i'$) may be calculated from the exclusive OR of: the old data ($D_i$) xor the new data ($D_i'$) xor $P_i$. Other parity calculation methods known in the art may also be used. Control transfers to block 150 which represents the adaptor 8a destaging the current data ($D_i'$) to a storage device. Control transfers to block 152 to write the calculated parity ($P_i'$) to the storage device 10a, b, c maintaining the parity Control then transfers to block 154 which represents the adaptor 8a deleting the current data $D_i'$ from write cache 20a and maintaining a copy of the current data $D_i'$ in the read cache 18a. At block 156, the adaptor 8a then changes the lock state on the current data $D_i'$ from write lock (WL) to read lock (RL), as the current data $D_i'$ is maintained in the read cache 18a.

Control transfers to block 158, which represents the adaptor 8a determining whether there are further dirty data blocks ($D_i'$) to destage. If so, control transfers to block 160 to access the next block to destage, and then proceeds back to block 142 et seq. to destage the next block of data. If there are no further dirty data blocks ($D_i$), then control proceeds to block 162 to end the destaging operation.

In alternative embodiments, if all the data blocks in a parity group are either in the read 18a or write 20a cache, then the new parity value can be calculated directly from the caches 18a, 20a without reading the storage devices 10a, b, c. In yet further embodiments, the destaging operation of FIG. 6 may be combined with the parity update operation of FIG. 5, such that when destaging dirty block D', new parity is computed.

Read Optimized Algorithm with Front-End/Back-End Locking

Figure 7:
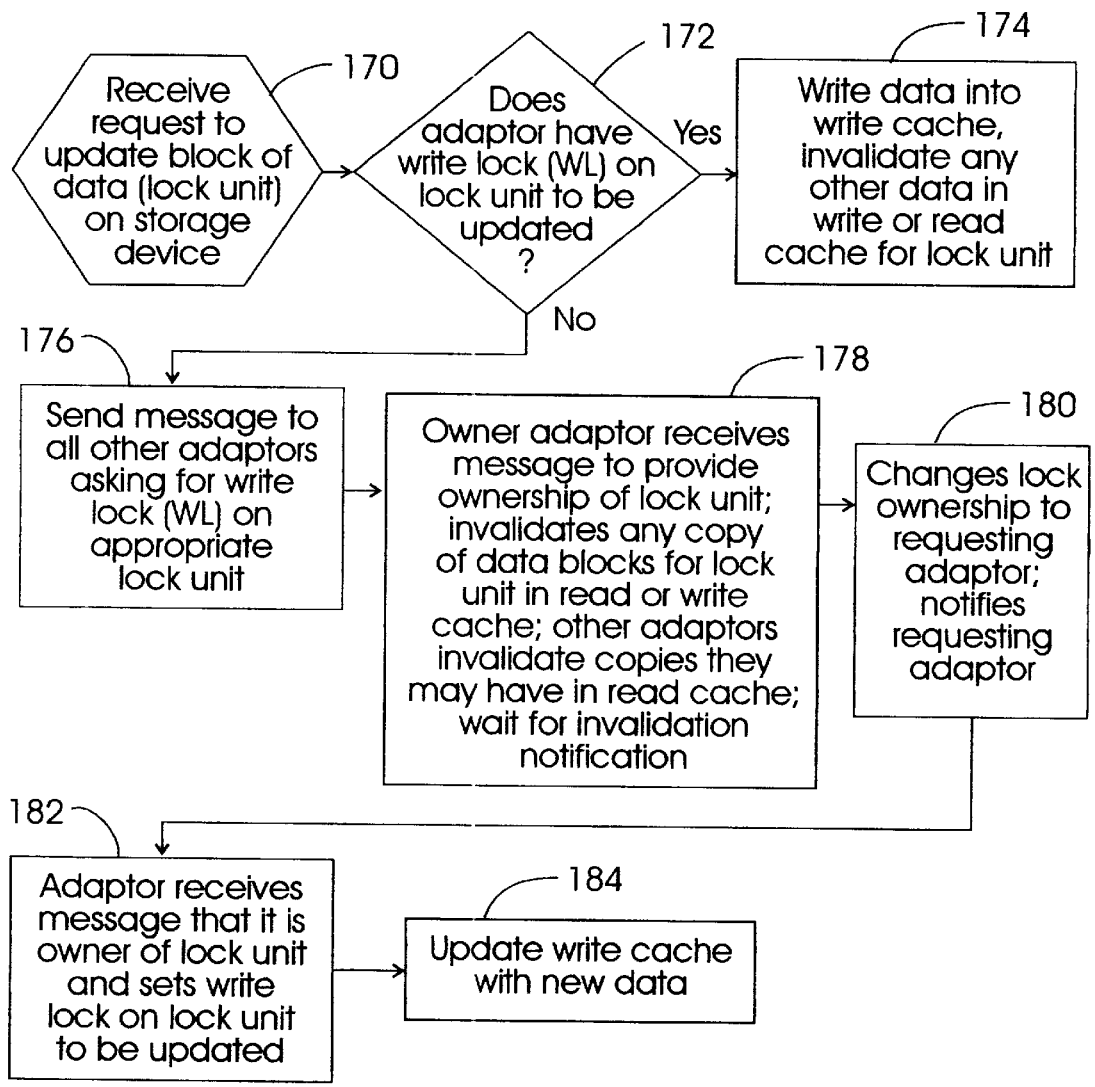
FIG. 7 illustrates a flowchart showing logic to update a data block in accordance with preferred embodiments of the present invention.

FIG. 7 illustrates preferred logic implemented in the adaptors 8a, b, c or the computer 6a, b, c to update data. This algorithm is read optimized because a read request can proceed without communicating to other adaptors, as long as no other adaptor has the requested data at a block in its write cache 20a, b, c. On the other hand, update requests in the read-optimized algorithm require broadcasting a message to all other adaptors, unless the adaptor has a write lock, i.e., is the owner.

The logic of FIG. 7 requires only a two state front-end lock state, unlocked or write lock (WL). Adaptors 8a, b, c that are not owners must consult the owning adaptor before proceeding with the read or update requests. Moreover, in preferred embodiments, to provide arbitration and control of access to the write cache 20a, b, c, an adaptor 8a, b, c must have a write lock (WL) on a lock unit before performing an update. In yet further embodiments, a data block can simultaneously be in the read cache 18 of multiple adaptors 8a, b, c.

Control begins at block 170 with an adaptor, e.g., adaptor 8a, receiving a request to update the data at a lock unit on a storage device 10a, b, c. Control transfers to block 172 which represents adaptor 8a determining whether it is the owner or has the write lock (WL) of the lock unit to be updated. If so, control transfers to block 174 which represents adaptor 8a updating the data for the lock unit in the write cache 20a, and invalidating any other data in the read 18a or write 20a cache for that lock unit. If the adaptor 8a does not have ownership, control transfers to block 176 which represents the adaptor 8a sending a message to all the other adaptors 8b, c asking for a write lock (WL) on the appropriate lock unit. Control transfers to block 178 which represents the owner adaptor, e.g., adaptor 8b, receiving a message to provide ownership of the lock unit. The owner adaptor 8b invalidates any copy of data blocks for the lock unit present in the read 18b or write 20b cache. Any other adaptor 8c invalidates a copy of the data blocks of the lock unit maintained in its read cache 18c. The owning adaptor 8b waits until it has received notification of this invalidation from all other adaptors 8c which had such copies of the data in the read cache 18c before proceeding.

After receiving notification that the other adaptor(s) have invalidated copies of the data in read cache, control transfers to block 180 which represents the owner adaptor 8b changing lock ownership to the requesting adaptor 8a and notifying the requesting adaptor 8a of the change in lock ownership. Control then transfers to block 182 which represents the adaptor 8a receiving the message indicating the change of ownership and setting a write lock (WL) on the lock unit to be updated. Control then transfers to block 184 which represents the adaptor 8a updating the write cache with the new data.

Figure 8:
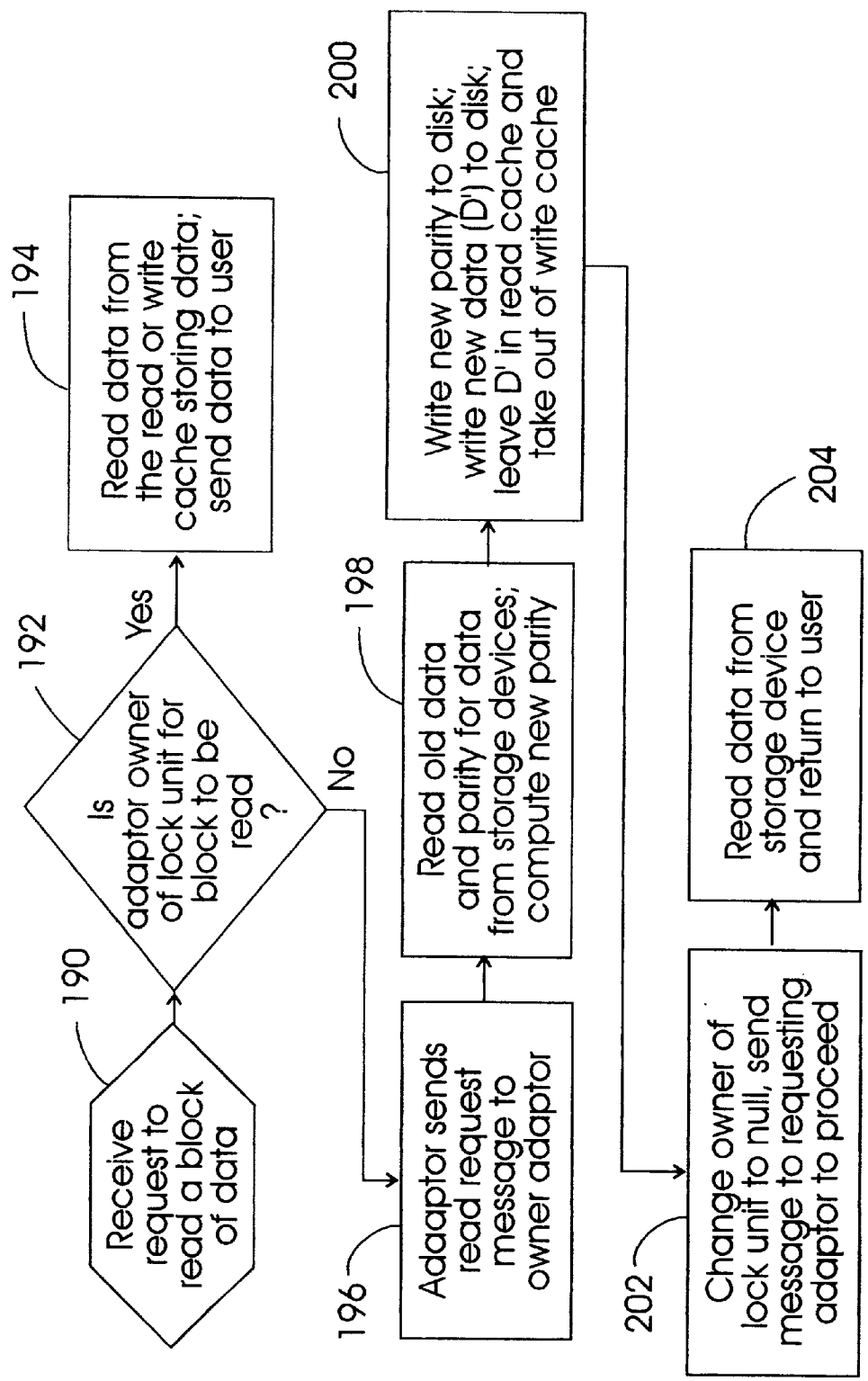
FIG. 8 illustrates a flowchart showing logic to read a data block in accordance with preferred embodiments of the present invention.

FIG. 8 illustrates preferred logic implemented in the adaptors 8a, b, c or the computer 6a, b, c for reading data. This algorithm is read optimized because a read request can proceed without communicating to other adaptors, as long as no other adaptor has the requested data in its write cache 20a, b, c.

Control begins at block 190 which represents the adaptor, e.g., adaptor 8a, receiving a request to read a block of data. Control transfers to block 192 which represents the adaptor 8a determining whether it is owns the lock unit for the data requested to be read. If so, control transfers to block 194 which represents the adaptor 8a reading the requested data blocks from the read 18a or write 20a cache and sending the data to the user. If the adaptor 8a does not own the lock unit, control transfers to block 196 which represents adaptor 8a sending a read request to the adaptor owning the lock unit, e.g., adaptor 8*b*. Control transfers to block 198 which represents the owner adaptor 8*b* reading the old data (D) from the storage device 10*b* and computing the new parity (P') from the old parity (P), old data (D), and new data (D'). In preferred embodiments, the adaptor 8*b* may compute the new parity from the exclusive OR equation (D xor D' xor P). However, alternative parity algorithms may be used. Control transfers to block 200 which represents the adaptor 8*b* writing the calculated new parity (P') to the storage device 10*a, b, c* maintaining the parity data, writing the updated data (D') to the storage device 10*b*, leaving the new data (D') in the read cache 18*b*, and deleting the old data from the write cache 20*b*. Control transfers to block 202 which represents the adaptor 8*b* changing the lock owner to null, and sending a message to the requesting adaptor 8*a* to proceed. Block 204 represents the adaptor 8*a* reading the data from the storage device 10*b* and returning the data to the user.

In alternative embodiments the owning adaptor 8*b* may perform alternative steps at blocks 198–202 to calculate the new parity (P') and update the new data (D') to disk. In a first alternative, after reading the old data (D) from the storage device, the adaptor 8*b* may calculate the partial parity, e.g., D xor D', and store the partial parity in the NVRAM 16*b*. The adaptor 8*b* will also store the information identifying the inconsistent parity group in the NVRAM 16*b*. The adaptor 8*b* further writes the new data (D') to the storage device 10*b*, leaving the new data (D') in the read cache 18*b* and erasing the new data (D') from the write cache 20*b*. The adaptor 8*b* then proceeds to block 202 to change the lock unit status for the updated data to null and notifying the requesting adaptor 8*a* to proceed.

In the first alternative, if the NVRAM 16*b* holding the partial parity data gets full, then the parity flushing algorithm of FIG. 5 can be used to write the new parity to the storage device storing parity data. If the write cache 20*b* gets full, then the destaging algorithm of FIG. 6 can be used. In the read-optimized case, after the destage completes, the front-end lock ownership, i.e., ownership of the write cache 20*b*, can be set to null.

In a second alternative embodiment, after block 196, the owner adaptor 8*b* would transmit a message to the requesting adaptor 8*a* along with the dirty data (D') from its write cache 20*b* for the requested lock unit and allow the requesting adaptor 8*a* to have ownership of the lock unit and the write lock (WL). After the requesting adaptor 8*a* receives the dirty data (D'), the owner adaptor 8*b* erases the dirty data (D') from the write cache 20*b*, changes the lock state from write lock (WL) to unlocked, and resets the lock ownership to the requesting adaptor 8*a*. The new owner adaptor 8*a* receives the new data D' into its write cache 20*a*, sets the lock state to write lock (WL), and sends requested data to the user.

High Availability Versions

To increase the availability of data in case of failure, at least two copies of new, updated data (D') could be maintained in at least two different adaptors. In one embodiment, a peer adaptor could maintain a shadow copy of data for another adaptor. On a write request, data is then written both to the local write cache and to the remote peer cache before returning to the host system. When destaging from the primary adaptor completes, the second copy of the data in the remote adaptors cache can be removed.

To implement this increased availability algorithm, an extra control and data message is required per update request to perform the update to the remote adaptor. Also, the number of control messages during destage may be doubled. Messages are needed at the end of destage to remove the second copy of the data. Peer (remote) adaptors can be made aware of which parity groups are being updated at the primary adaptor. By using four messages during destage, instead of two, recovery time also improves because peer adaptors are made aware of specifically which parity groups were being updated by the failed adaptor when the adaptor failed.

CONCLUSION

This concludes the description of the preferred embodiments of the invention. The following describes some alternative embodiments for accomplishing the present invention.

In preferred embodiments, adaptors 8*a, b, c* interface the nodes 4*a, b, c* to allow sharing of storage resources. The adaptors 8*a, b, c* were described as having specific components, such as a processor 14*a, b, c*, NVRAM 16*a, b, c*, read cache 18*a, b, c*, write cache 20*a, b, c*, and NVS unit 22*a, b, c*. In alternative embodiments, some or all the components of the adaptors 8*a, b, c* may be located elsewhere in the node 4*a, b, c* or share resources with the computer 6*a, b, c*. In yet further embodiments, there may be a central computing resource or node that monitors or controls intercommunication between the nodes 4*a, b, c*.

The write cache 20*a, b, c* and read cache 18*a, b, c* may be memory locations within a single memory device or memory locations within a separate memory device, comprised of any suitable memory device known in the art, including volatile and non-volatile memory devices.

The logic of FIGS. 4*a, b,* 5–8 is for illustrative purposes. Additional or alternative steps may be performed in addition to those illustrated in the logic. Further, the order of the steps in the preferred logic may also vary.

In summary, preferred embodiments in accordance with the present invention provide a system for performing an operation on a data block in a shared disk system. A first adaptor receives a request to perform an operation on a data block maintained in a data storage location. The first adaptor then determines whether the first adaptor controls access to the data block. The first adaptor performs the requested operation on the data block after determining that the first adaptor controls access to the data block. If the first adaptor does not control access to the data block, then the first adaptor transmits a first message to a second adaptor that controls access to the data block and requests control of access to the data block. After receiving the first message, the second adaptor transfers control of access to the data block to the first adaptor. The second adaptor then transmits a second message to the first adaptor that the first adaptor controls access to the data block. After receiving the second message, the first adaptor performs the requested operation on the data block.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing an operation on a data block in a shared storage device system, comprising:
   (a) receiving a request with a first processing unit to perform an operation on a data block maintained in a data storage location;
   (b) determining, by the first processing unit, whether the first processing unit controls access to the data block;
   (c) performing the requested operation on the data block with the first processing unit after determining that the first processing unit controls access to the data block;
   (d) after determining, by the first processing unit, that the first processing unit does not control access to the data block, obtaining, with the first processing unit, control to the data block from a second processing unit; and
   (e) performing with the first processing unit the requested operation on the data block.

2. The method of claim 1, wherein the step of the first processing unit obtaining control of the data block, comprises the steps of:
   (i) transmitting a first message to the second processing unit that controls access to the data block requesting control of access to the data block;
   (ii) the second processing unit, after receiving the first message, transfers control of access to the data block to the first processing unit; and
   (iii) transmitting a second message with the second processing unit to the first processing unit that the first processing unit controls access to the data block, wherein the first processing unit performs the requested operation on the data block after receiving the second message.

3. The method of claim 1, wherein there are N processing units in addition to the first and second processing units, wherein N is an integer value greater than zero, further including the step of transmitting a third message to the N processing units indicating that the first processing unit controls access to the data block after the second processing unit transfers control of access to the data block to the first processing unit.

4. The method of claim 1, wherein the requested operation is a write operation to update the data block, wherein the step of performing the requested operation after determining that the first processing unit controls access to the data block comprises writing an update to the data block into a memory location and setting a lock state on the data block, wherein the step of requesting access to the data block further comprises requesting a lock state on the data block, and wherein the step of performing the requested operation with the first processing unit after receiving the second message comprises setting a lock state on the data block with the first processing unit and writing the update to the data block into the memory location.

5. The method of claim 4, wherein the memory location including the update to the block of data is a first memory location, further including the steps of:
   writing the update to the data block from the first memory location to a storage device;
   transferring a copy of the update to the data block to a second memory location; and
   deleting the update to the data block from the first memory location.

6. The method of claim 5, further including the step of changing a lock state for the data block from a first lock state to a second lock state, wherein the second lock state indicates that the update to the data block is maintained in the second memory location.

7. The method of claim 4, further including the steps of:
   writing the update to the data block from the memory location to a storage device; and
   changing a lock state for the data block from a first lock state to a second lock state, wherein the second lock state indicates that the update to the data block is in the storage device.

8. The method of claim 4, wherein the data block prior to the update is maintained in a data storage location, wherein parity data is maintained for the data block in a parity storage location, further including the steps of:
   reading parity data from the parity storage location;
   computing new parity data for the update to the data block;
   writing the new parity data to the parity storage location;
   writing the update to the data block to the data storage location; and
   deleting the update to the data block from the memory location.

9. The method of claim 8, further including the steps of:
   determining whether the first processing unit controls access to the parity data;
   performing the steps of calculating the new parity data, writing the new parity data, writing the update to the data block, and deleting the update to the data block from the memory location after determining that the first processing unit controls access to the parity data; and
   after determining that the first processing unit does not control access to the parity data, performing the steps of:
      (i) transmitting a third message to a second processing unit controlling access to the parity data requesting control of access to the parity data;
      (ii) transmitting a fourth message from the second processing unit to the first processing unit that the first processing unit controls access to the parity data; and
      (iii) performing the steps of reading the parity data, computing the new parity data, writing the update to the data block to the data storage location, writing the new parity data to the parity storage location, and deleting the update to the data block from the memory location after the first processing unit receives the fourth message.

10. The method of claim 8, wherein the new parity data is calculated by taking the exclusive OR of the data block, the update to the data block, and the parity data for the data block.

11. A method for performing a read operation on a data block in a shared disk system, comprising:
   (a) receiving a read request with a first processing unit for a data block maintained in a data storage location;
   (b) determining, by the first processing unit, whether the first processing unit controls access to the data block;
   (c) reading the data block after determining that the first processing unit controls access to the data block;
   (d) after determining, by the first processing unit, that the first processing unit does not control access to the data block, obtaining control with the first processing unit to the data block; and (e) performing the requested read operation on the data block.

12. The method of claim 11, wherein the step of performing the requested read operation comprises writing the update to the data block stored in the memory location to a data storage location and reading the update to the data block written to the data storage location.

13. The method of claim 11, wherein parity data is maintained for the data block in a parity storage location, wherein the step of writing with the second processing unit data from a second cache managed by the second processing unit to the data block in a storage device further comprises the second processing unit performing the steps of:

reading the parity data for the data block from the parity storage location;

computing the new parity; and writing the new parity to the parity storage location.

14. The method of claim 13, wherein the new parity is calculated by an exclusive OR operation on the data block read from the parity storage location, the update to the data block, and the parity data.

15. The method of claim 13, wherein parity data is maintained for the data block in a parity storage location, wherein the step of writing with the second processing unit data from a second cache managed by the second processing unit to the data block in a storage device further comprises the second processing unit performing the steps of:

reading the parity data for the data block from a parity storage location; calculating partial parity data based on the data block and the update to the data block;

storing the partial parity in a non-volatile storage device;

writing the data block from the second cache to the storage device;

transferring the data block from the second cache to a third cache; and deleting the data block from the second cache.

16. The method of claim 15, further comprising the steps of calculating the new parity data for partial parity data maintained in the non-volatile storage device and writing the new parity data to the parity storage location.

17. The method of claim 15, wherein step of the first processing unit performing the requested operation after determining that the first processing unit does not control access to the data block further comprises the steps of:

transmitting with the first processing unit a third message to the second processing unit after storing the data block in the first cache; and deleting with the second processing unit the data block from the second cache.

18. A computer system for performing an operation on a data block in a shared disk system, comprising:

(a) a first processing unit including means for receiving a request with a first processing unit to perform an operation on a data block;

(b) a second processing unit in data communication with the first processing unit; and (c) program logic implemented in the first and second processing units, comprising:

(i) means for determining whether the first processing unit controls access to the data block;

(ii) means for performing the requested operation with the first processing unit upon determining, by the first processing unit, that the first processing unit controls access to the data block;

(iii) means for transmitting a first message to a second processing unit that controls access to the data block requesting control of access to the data block upon determining that the second processing unit controls access to the data block;

(iv) means for transferring control of access to the data block to the first processing unit; and (v) means for transmitting a second message with the second processing unit to the first processing unit that the first processing unit controls access to the data block.

19. The computer system of claim 18, further comprising N processing units in addition to the first and second processing units, wherein N is an integer value greater than zero, further including the step of transmitting a third message to the N processing units indicating that the first processing unit controls access to the data block after the second processing unit transfers control of access to the data block to the first processing unit.

20. The computer system of claim 18, wherein the requested operation is a write operation to update the data block, further comprising:

a memory location managed by the first processing unit; and means, included in the program logic, for writing an update to the data block into the memory location and setting a lock state on the data block indicating that the update to the data is maintained in the memory location after determining that the first processing unit controls access to the data block.

21. The computer system of claim 20, wherein the memory location is a first memory location, further comprising:

a storage device, wherein the program logic further includes means for writing the update to the data block from the first memory location to the storage device; and a second memory location associated with the first processing unit, wherein the program logic further includes means for transferring a copy of the update to the data block to the second memory location and deleting the update to the data block from the first memory location.

22. The computer system of claim 20, further comprising:

a data storage location, wherein the data block is maintained in the data storage location; and a parity storage location maintaining parity data for the data block, wherein the program logic further includes:

(i) means for reading parity data from the parity storage location;

(ii) means for computing new parity data for the update to the data block; and (iii) means for writing the new parity data to the parity storage location.

23. The computer system of claim 20, wherein the memory location storing the update to the data is a first memory location, further including:

a parity storage location including parity data for the data block in a parity storage location;

a non-volatile storage device for storing partial parity data calculated from the data block and the update to the data block, wherein the partial parity data indicates the parity data that is outdated as a result of the update to the data block;

a data storage location, wherein the program logic includes means for writing the update to the data block to the data storage location and deleting the update to the data block from the first memory location; and a second memory location, wherein the update to the data block is copied from the first memory location to the second memory location.

24. The computer system of claim 18, wherein the requested operation is a read operation to read the data block and transfer the read data to a requestor, further comprising:
   a first cache managed by the first processing unit;
   a second cache managed by the second processing unit,
   a storage device;
   program logic means implemented in the second processing unit for writing the data block from the second cache to the storage device; and
   program logic means implemented in the first processing unit for performing the requested operation by reading the data block from the storage device and transferring the read data block to the requestor.

25. The computer system of claim 18, wherein the requested operation is a read operation to read the data block and transfer the read data to a requestor, further comprising:
   a first cache managed by the first processing unit;
   program logic means implemented in the first processing unit for performing the requested read operation after determining that the first processing unit controls access to the data block by reading the data block from the first cache and transferring the read data to the requestor;
   a second cache managed by the second processing unit;
   program logic means implemented in the second processing unit for transmitting the data block from the second cache to the first processing unit after transferring control of access to the data block to the first processing unit; and
   program logic means implemented in the first processing unit for writing the data block transmitted from the second processing unit into the first cache and transferring the read data to the requestor.

26. An article of manufacture for use in programming a first and second processing units in a shared disk system, the article of manufacture comprising computer readable storage media within the first and second processing units, wherein the computer readable storage media has at least one computer program embedded therein that causes the first and second processing units to perform the steps of:
   (a) receiving a request with a first processing unit to perform an operation on a data block maintained in a data storage location;
   (b) determining, by the first processing unit, whether the first processing unit controls access to the data block;
   (c) performing the requested operation on the data block with the first processing unit after determining that the first processing unit controls access to the data block;
   (d) after determining, by the first processing unit, that the first processing unit does not control access to the data block, obtaining control with the first processing unit to the data block; and
   (e) performing with the first processing unit the requested operation on the data block.

27. The article of manufacture of claim 26, wherein the step of the first processing unit obtaining control of the data block comprises the steps of:
   transmitting a first message to a second processing unit that controls access to the data block requesting control of access to the data block;
   the second processing unit, after receiving the first message, transfers control of access to the data block to the first processing unit; and transmitting a second message with the second processing unit to the first processing unit that the first processing unit controls access to the data block.

28. The article of manufacture of claim 27, wherein there are N processing units in addition to the first and second processing units, wherein N is an integer value greater than zero, further including the step of transmitting a third message to the N processing units indicating that the first processing unit controls access to the data block after the second processing unit transfers control of access to the data block to the first processing unit.

29. The article of manufacture of claim 27, wherein the requested operation is a write operation to update the data block, wherein the step of performing the requested operation after determining that the first processing unit controls access to the data block comprises writing an update to the data block into a memory location and setting a lock state on the data block, wherein the step of requesting access to the data block further comprises requesting a lock state on the data block, and wherein the step of performing the requested operation with the first processing unit after receiving the second message comprises setting a lock state on the data block with the first processing unit and writing the update to the data block into the memory location.

30. The article of manufacture of claim 29, further including the steps of:
   writing the update to the data block from the memory location to a storage device; and
   changing a lock state for the data block from a first lock state to a second lock state, wherein the second lock state indicates that the update to the data block is in the storage device.

31. The article of manufacture of claim 29, wherein the data block prior to the update is maintained in a data storage location, wherein parity data is maintained for the data block in a parity storage location, further including the steps of:
   reading parity data from the parity storage location;
   computing new parity data for the update to the data block;
   writing the new parity data to the parity storage location;
   writing the update to the data block to the data storage location; and
   deleting the update to the data block from the memory location.

32. The article of manufacture of claim 26, wherein the requested operation is a read operation to read the data block and transfer the read data to a requestor, wherein the step of performing the requested read operation after determining that the first processing unit controls access to the data block comprises reading the data block from a first cache managed by the first processing unit and transferring the read data to a requestor, and wherein after determining that the first processing unit does not control access to the data block, performing the step of writing with the second processing unit the data block from a second cache managed by the second processing unit to a storage device, wherein the first processing unit performs the requested operation by reading the data block from the storage device and transferring the read data block to the requestor.

33. The article of manufacture of claim 32, wherein parity data is maintained for the data block in a parity storage location, wherein the step of writing with the second processing unit data from a second cache managed by the second processing unit to the data block in a storage device further comprises the second processing unit performing the steps of:

reading the parity data for the data block from the parity storage location;

computing the new parity; and writing the new parity to the parity storage location.

34. The article of manufacture of claim 32, wherein parity data is maintained for the data block in a parity storage location, wherein the step of writing with the second processing unit data from a second cache managed by the second processing unit to the data block in a storage device further comprises the second processing unit performing the steps of:

reading the parity data for the data block from a parity storage location;

calculating partial parity data based on the data block and the update to the data block;

storing the partial parity in a non-volatile storage device;

writing the data block from the second cache to the storage device;

transferring the data block from the second cache to a third cache; and deleting the data block from the second cache.

35. The article of manufacture of claim 26, wherein the requested operation is a read operation to read the data block and transfer the read data to a requestor, wherein the step of performing the requested read operation after determining that the first processing unit controls access to the data block comprises:

reading the data block from a first cache managed by the first processing unit; and transferring the read data to a requestor;

wherein the step of transmitting the second message after determining that the first processing unit does not control access to the data block further comprises:

transmitting the data block from a second cache managed by the second processing unit to the first processing unit, and wherein the step of the first processing unit performing the requested operation after determining that the first processing unit does not control access to the data block comprises the first processing unit writing the data received from the second processing unit into the first cache and transferring the read data to the requestor.

* * * * *